(12) United States Patent
Liang et al.

(10) Patent No.: US 11,827,518 B1
(45) Date of Patent: Nov. 28, 2023

(54) CARBON NANOHORNS COMPOSITE MATERIAL WITH MICROWAVE ABSORPTION AND TUNABLE ABSORPTION BANDS AND METHOD FOR PREPARING THE SAME

(71) Applicant: KUNMING UNIVERSITY OF SCIENCE AND TECHNOLOGY, Kunming (CN)

(72) Inventors: Feng Liang, Kunming (CN); Zhipeng Xie, Kunming (CN); Da Zhang, Kunming (CN); Long Ma, Kunming (CN); Yichang Liu, Kunming (CN); Junxi Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/315,162

(22) Filed: May 10, 2023

(30) Foreign Application Priority Data

Apr. 27, 2023 (CN) .......................... 202310474367.6

(51) Int. Cl.
*C01B 32/18* (2017.01)

(52) U.S. Cl.
CPC .......... *C01B 32/18* (2017.08); *C01P 2002/02* (2013.01); *C01P 2004/32* (2013.01); *C01P 2004/64* (2013.01); *C01P 2004/88* (2013.01); *C01P 2006/80* (2013.01)

(58) Field of Classification Search
CPC .. C01B 32/18; C01P 2002/02; C01P 2004/32; C01P 2004/88; C01P 2006/80
See application file for complete search history.

(56) References Cited

U.S. PATENT DOCUMENTS

| 10,703,633 | B2 | 7/2020 | Yuge |
|---|---|---|---|
| 2017/0200941 | A1 | 7/2017 | Yuge |
| 2018/0162735 | A1 | 6/2018 | Yuge |

FOREIGN PATENT DOCUMENTS

| CN | 108503230 A | * | 9/2018 |
|---|---|---|---|
| CN | 110976896 A | | 4/2020 |
| CN | 110976897 B | | 6/2022 |

OTHER PUBLICATIONS

Jang, Kun-Ho, et al. "Synthesis of Carbon Nanofibers and Silicon-Carbon Nanofiber Composites on Electroplated Co—Ni/C-Fiber Textiles for Anode Material of Li Ion Batteries." Journal of Nanoscience and Nanotechnology 17.11 (2017): 8500-8505.*

* cited by examiner

*Primary Examiner* — Richard M Rump
(74) *Attorney, Agent, or Firm* — Daniel M. Cohn; Howard M. Cohn

(57) ABSTRACT

The present disclosure relates to a method for production of CNHs composite material. The method includes the following steps: a first step: the silicon particles and graphite powder are mixed for a preset time by planetary ball mill device, and the weight ratio of silicon element to carbon element is 10-40%, then the Si/C precursor is obtained; a second contact step: the Si/C precursor is pressed into a precursor block, then using precursor block to the CNHs composite material by a DC arc plasma device.

11 Claims, 10 Drawing Sheets

Preparation of Si/C precursor: the silicon particles and graphite powder are mixed by grinding with a weight ratio of silicon element to carbon element is 0-40% for a predetermined time to obtain a Si/C precursor.

Preparation of anode (precursor block): the Si/C precursors are compressed into block by cold isostatic pressing device.

Preparation of CNHs composite material : putting Si/C precursors as an anode into a DC arc plasma device, a graphite rod sharpened at one end as a cathode and is arranged opposite to the anode, filling the plasma device with preset gas, and then starting the plasma device to synthesis CNHs composite material .

FIG. 1

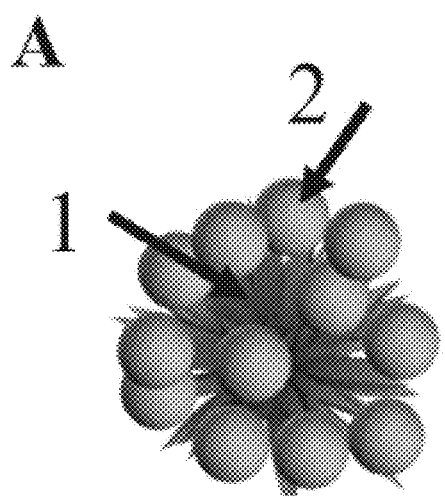

FIG. 2A

CARBON NANOHORNS COMPOSITE MATERIAL WITH MICROWAVE ABSORPTION AND TUNABLE ABSORPTION BANDS AND METHOD FOR PREPARING THE SAME

CROSS-REFERENCE TO RELATED APPLICATIONS

The present application claims foreign priority to Chinese Patent Application No. CN202310474367.6, titled: Carbon nanohorns composite material with microwave absorption and tunable absorption bands and method for preparing the same, filed on Apr. 27, 2023 in the State Intellectual Property Office of China, and the entire contents of which is hereby incorporated by reference.

TECHNICAL FIELD

The present disclosure relates to the technical field of preparation of lightweight microwave absorbing material with excellent microwave absorption and tunable absorption bands.

BACKGROUND

Microwave absorbing materials are referred to as absorbing materials, which can absorb and attenuate incident electromagnetic (EM) waves, convert electromagnetic energy into heat energy or other forms of energy, or make electromagnetic waves disappear due to interference. Absorbing materials are widely used in military and civilian fields. In the military field, microwave absorbing materials can be used as an important military stealth functional material. Its function is to reduce or eliminate the detection of aircraft, tanks, ships, etc. by electromagnetic waves generated by radar and infrared rays. In the civil field, absorbing materials can be used for electromagnetic information leakage protection, electromagnetic radiation protection and building absorbing materials, etc., to absorb unwanted electromagnetic waves. Researchers are committed to researching absorbing materials with thin coating, lightweight, wide absorbing band and strong absorbing performance. Carbon materials are lightweight microwave absorbing materials with tunable conductivity, strong dielectric loss, excellent mechanical properties and good corrosion resistance. Carbon nanohorns (CNHs) have great application potential in the field of electromagnetic wave absorption due to their excellent electrical conductivity, abundant defects, large specific surface area, and extremely low density. However, it is affected by impedance mismatch and single microwave loss mechanism when used alone, resulting in a narrow absorption frequency band and weak microwave absorption (MA) loss. Therefore, researchers compound carbon materials with other materials and introduce multiple microwave loss mechanisms to improve the impedance matching of microwave absorbing materials. Building a core-shell structure can solve the problems of dispersion and agglomeration, and the ingenious combination of the core layer and the shell layer can form multiple interfaces, and the corresponding interface polarization and multiple relaxations can further enhance the dielectric and absorbing properties of the system. Nevertheless, the synthesis process of core-shell structure absorbing materials is complex, and the synthesis time is long. Multi-layer core-shell structures often require multi-step coating, and harsh reaction conditions, such as high temperature and long-term hydrothermal reaction, inevitably increase energy consumption and pollutant emissions. Moreover, the synthesis of carbon-based core-shell materials often takes a day or even longer, further increasing production costs. Therefore, it is necessary to simplify the synthesis process of high-performance core-shell absorbing materials and improve their industrial application efficiency.

The application uses arc plasma technology to construct a core-shell structure of CNHs wrapped in silicon dioxide, and obtains a CNHs composite absorbing material that can adjust the absorbing frequency band, and the process is simple and the preparation time is short. Technically, it realizes the controllable adjustment of the absorbing performance in different frequency bands, greatly broadens the absorbing frequency band, and has excellent absorbing performance.

BRIEF DESCRIPTION OF DRAWINGS

FIG. 1 is a flow chart showing a method for CNHs composite material.

FIG. 2A is a schematic view of CNHs composite material, and A is a thin shell structure.

DETAILED DESCRIPTION

First Aspect

A first aspect of the present disclosure relates to a method for preparing lightweight CNHs (Carbon Nano Horns) composite material with excellent microwave absorption and tunable absorption bands (FIG. 1), the method including:

a. The silicon particles and graphite powder are mixed by grinding with a weight ratio of silicon element to carbon element is 10-40% for a predetermined time to obtain a Si/C precursor.

b. Compression of the Si/C precursors into a block by a cold isostatic pressing device to obtain the precursor block.

c. Putting the precursor block as an anode into a DC arc plasma device, a graphite rod sharpened at one end as a cathode arranged opposite to the anode, filling the plasma device with preset gas, and then starting the plasma device to synthesis CNHs composite material with excellent microwave absorption and tunable absorption bands.

In the first step of the method of the present disclosure, the silicon particles and graphite powder are in micron size. The two material is mixed by planetary ball mill device with the speed of 100-200 r/min. The predetermined time for mixing is 10-30 min.

In the second step of the method of the present disclosure, the pressure and pressure holding time of the cold isostatic pressing device is 8-12 MPa and 5-20 min, respectively. The precursor block is a cylinder with a diameter of 20 mm.

In the third step of the method of the present disclosure, the diameter of the cathode graphite rod is 10-15 mm, and the distance between cathode and anode is 2-5 mm. The pressure of preset gas is 40-100 kPa. The working current of the DC arc plasma device is 120-300 A.

In the present disclosure, a duration of the discharge time of the DC arc plasma device is not specifically limited as long as purpose of the present disclosure may be achieved. Generally, as long as the graphite block is not exhausted, the DC arc plasma device can be discharged continuously.

The preset gas used in the present disclosure may be pure carbon dioxide, pure carbon monoxide, oxygen, air, or a mixture of two or more of these gases. These preset gases can ionize oxygen atoms and oxygen ion in the DC arc plasma device which promote the formation of $SiO_2$ and oxygen doped CNHs.

Second Aspect

A second aspect of the present disclosure relates to lightweight CNHs composite material with excellent microwave absorption and tunable absorption bands. The CNHs composite material is prepared by the method of the first aspect.

Figure 2B:
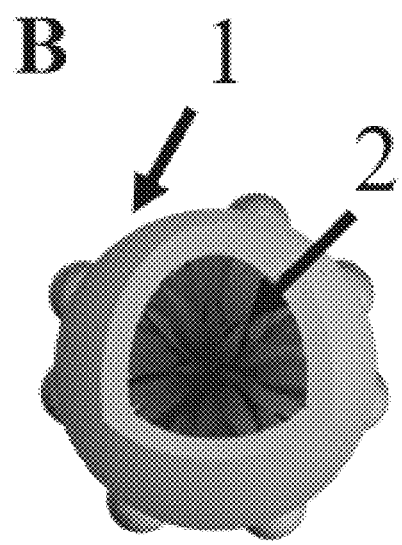
FIG. 2B is a schematic view of CNHs composite material, and B is a thick shell structure.

FIG. 2A-2B show the CNHs composite material is a core-shell structure with CNHs as the core 1 and amorphous silicon dioxide as the shell 2, the CNHs are surrounded by a large number of silicon dioxide nanoparticles to form a core-shell structure, and the thickness of the shell increases along with increasing of silicon dioxide content. As shown in FIG. 2A-2B, A is a thin shell structure and B is a thick shell structure.

The CNHs is in a spherical shape with a spherical diameter of 60-180 nm, i.e., a spherical diameter of the CNHs composite material is 100 nm.

The CNHs composite material obtained by the method of the present disclosure has the ratio of the intensity of peak D to peak G ($I_D/I_G$ vale) of 1.1-1.5.

The thickness of $SiO_2$ shell of CNHs composite material is 5-30 nm.

The mass ratio of $SiO_2$ shell of CNHs composite material is 6-62%.

In a specific embodiment, the CNHs composite material of the present disclosure has an $I_D/I_G$ vale of 1.46. In a specific embodiment, the thickness of $SiO_2$ shell is 10 nm. In a specific embodiment, the mass ratio of $SiO_2$ in composite material is 46%.

Third Aspect

A third aspect of the present disclosure relates to the application of CNHs composite material of the present disclosure or CNHs composite material obtained by the method of the present disclosure. The CNHs composite material prepared by the present disclosure can be used in various known microwave composite material applications, but is broader than it. The CNHs composite material has a very wide material application range. Currently, the CNHs composite material of the present disclosure has excellent performance in microwave absorption field.

Example 1 of the present disclosure illustrates the application of the CNHs composite material of the present disclosure in microwave absorption, wherein the CNHs composite material of the present disclosure has tunable absorption bands. The $SiO_2$ shell can enhance the impedance matching of the material and allow more microwaves to enter the material, meanwhile, the doped oxygen atoms introduce more active sites in CNHs and it can enhance the polarization loss of the material. In addition, the CNHs composite material with ultra-low density have great advantages over existing $C/SiO_2$ composite absorbing material.

Test Methods

The CNHs composite material (the characterization thereof): the CNHs composite material may be characterized by TG, Raman, TEM, BET measurements, XPS, network analyzer and other methods. In the present disclosure, the heteroatom-doped CNHs is characterized mainly by Raman spectrum, TEM, BET, TG and network analyzer measurements.

Defect level: The defect level of CNHs may be measured by Raman, and the defect level is indicated by the value of $I_D/I_G$. In the present disclosure, the value of $I_D/I_G$ of CNHs composite material is higher than 1.1.

Shell thickness: The thickness of the $SiO_2$ shell coated on CNHs composite material may be measured by TEM and other methods. In the present disclosure, the thickness of the $SiO_2$ shell is measured mainly by TEM.

Crystal structure: The crystal structure of $SiO_2$ shell can be analyzed by TEM. In the present disclosure, the crystal structure of $SiO_2$ shell is amorphous.

Specific surface area: In the present disclosure, the specific surface area, total pore volume and average pore size may be measured by BET.

The mass ratio of $SiO_2$ in composite material: In the present disclosure, the mass ratio of $SiO_2$ in composite material is measured by TG.

Performance of microwave absorption: The microwave absorption properties of CNHs composite material is analyzed by network analyzer. In the present disclosure, the EM parameters of CNHs composite material is measured by network analyzer, and the RL of CNHs composite material is calculated by these EM parameters.

Example 1

The Si/C precursor was obtained by mixing silicon particles with graphite powder with the planetary ball mill device at a speed of 150 r/min for 15 min, and a weight ratio of silicon element to carbon element is 20%.

Put the precursor into a mold, and performed cold isostatic pressing at a pressure of 10 MPa and holding the pressure for 25 min to obtain precursor block;

Put the graphite block as an anode into a carbon crucible, a graphite rod sharpened at one end as a cathode, and perform plasma treatment in a 70 kPa ($CO_2$:$O_2$=1:1) atmosphere. The working current is 175 A. Finally, the CNHs composite material were obtained, and which was put in a dry environment for storage.

Figure 3:
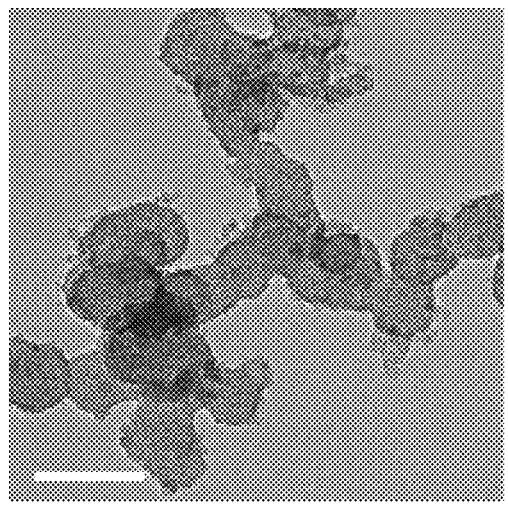
FIG. 3 is a transmission electron microscope (TEM) image of CNHs composite material prepared in Example 1 (Scale bar is 100 nm).
Figure 4A:
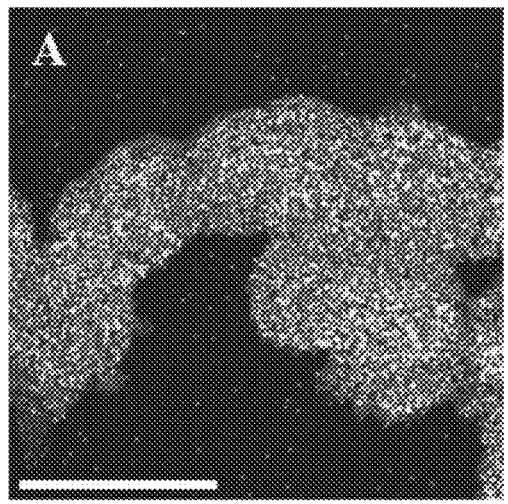
FIG. 4A is elemental mapping of CNHs composite material in Example 1 (Scale bar is 100 nm), and A is a mapping of a total element.
Figure 4B:
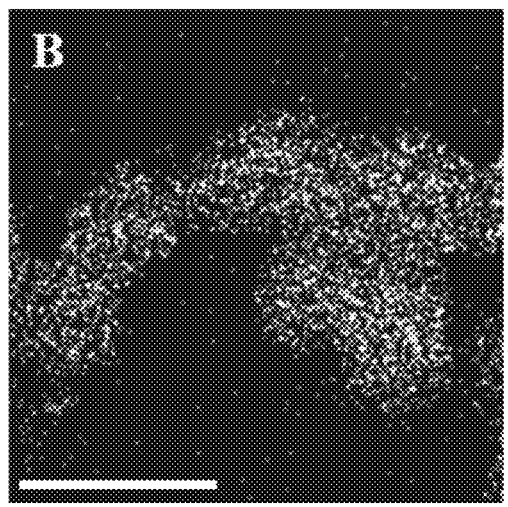
FIG. 4B is elemental mapping of CNHs composite material in Example 1 (Scale bar is 100 nm), and B is a mapping of a carbon element.
Figure 4C:
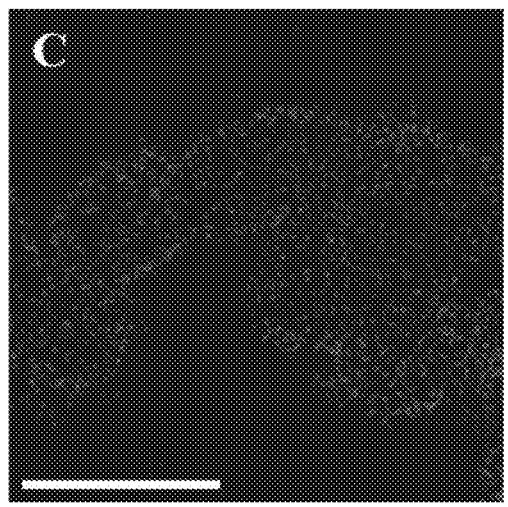
FIG. 4C is elemental mapping of CNHs composite material in Example 1 (Scale bar is 100 nm), and C is a mapping of a silicon element.
Figure 4D:
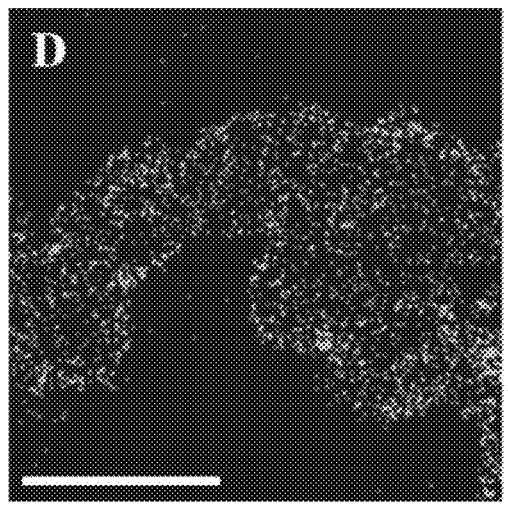
FIG. 4D is elemental mapping of CNHs composite material in Example 1 (Scale bar is 100 nm), and D is a mapping of an oxygen element.
Figure 5:
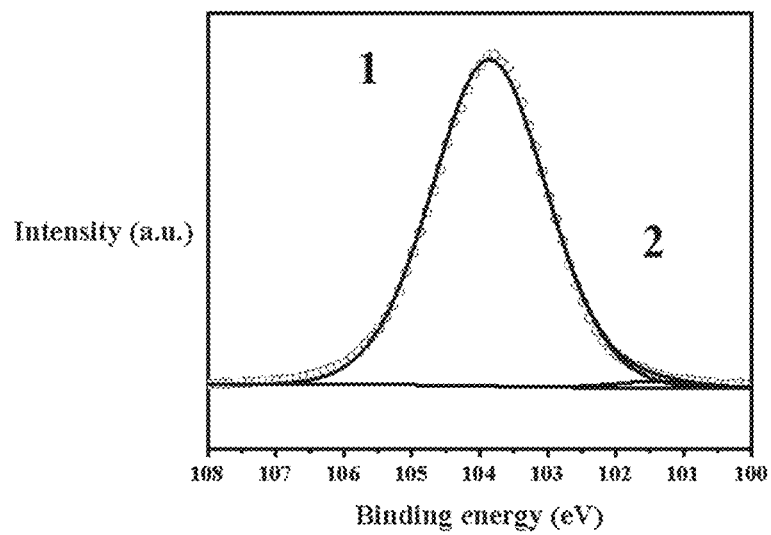
FIG. 5 is X-ray photoelectron spectroscopy (XPS) survey spectra for the Si 2p regions of CNHs composite material in Example 1.
Figure 6:
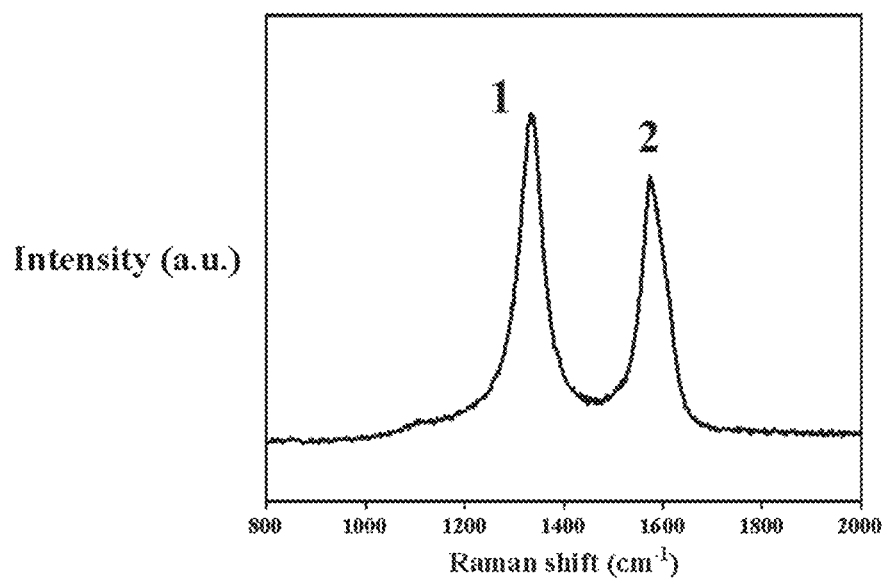
FIG. 6 is Raman spectrometry (Raman) of CNHs composite material in Example 1.
Figure 7:
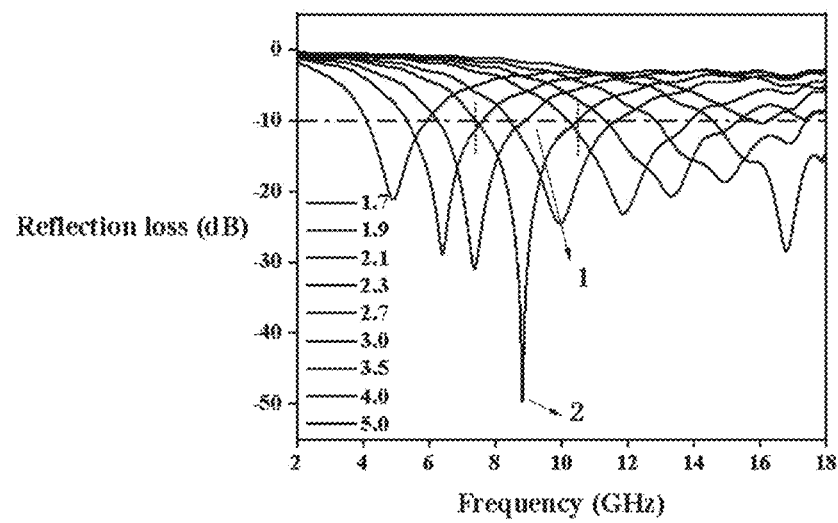
FIG. 7 is the reflection loss (RL) of CNHs composite material in Example 1.

In Example 1, the TEM image of the CNHs composite material shows that these composite materials are core-shell structure, and the CNHs is on the inside, and the shell is amorphous structure with the shell thickness of ~16 nm (FIG. 3). In FIG. 4A-FIG. 4D, the elemental mapping of CNHs composite material shows that the element of shell are Si and O. In FIG. 5, the Si 2p XPS spectrum of CNHs composite material shows that the binding energy at 101.28 eV and 103.88 eV are belonged to Si—C 2 and Si—O—Si 1 bonds. This result indicates that the O element is doped into the CNHs, and the $SiO_2$ arises in CNHs composite material. In conclusion, the shell of CNHs composite material is amorphous $SiO_2$. Raman spectrum of CNHs material (FIG. 6) shows that the ratio of the intensity of peak D 1 to peak G 2 is 1.24. It is attributed to the doping of oxygen atoms that further increases the structural defects of CNHs. The FIG. 7 shows that the MA capability of CNHs composite material in this example, and the effective absorption bandwidth ($EAB_{max}$) exhibiting absorption capacity in C and X band 1. And the minimum RL value 2 of −49.7 dB at 8.8 GHz with the thickness of 3.0 mm. And This is owing to the good impedance matching ability of $SiO_2$ on the surface of CNHs, and it result in more electromagnetic wave entering the composite material efficiently.

Example 2

The Si/C precursor was obtained by mixing silicon particles and graphite powder by using the planetary ball mill device at a speed of 200 r/min for 10 min, and a weight ratio of silicon element to carbon element is 16%.

Put the precursor into a mold, and performed cold isostatic pressing at a pressure of 9 MPa and holding the pressure for 30 min to obtain precursor block;

Put the graphite block as an anode into a carbon crucible, a graphite rod sharpened at one end as a cathode, and perform plasma treatment in a 60 kPa ($CO_2$:air=1:1) atmosphere. The working current is 200 A. Finally, the CNHs composite material were obtained, and which was put in a dry environment for storage.

Figure 8:
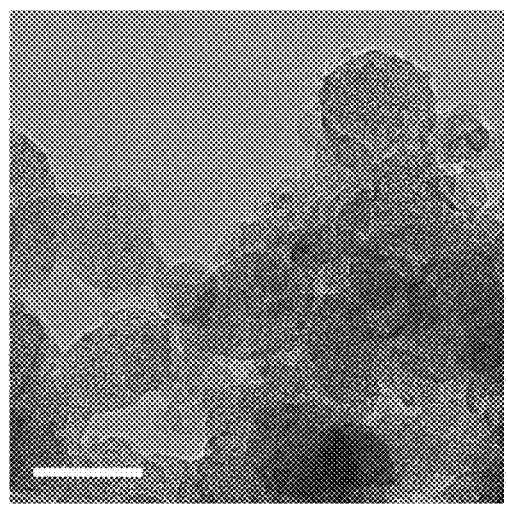
FIG. 8 is a TEM image of CNHs composite material prepared in Example 2 (Scale bar is 100 nm).
Figure 9:
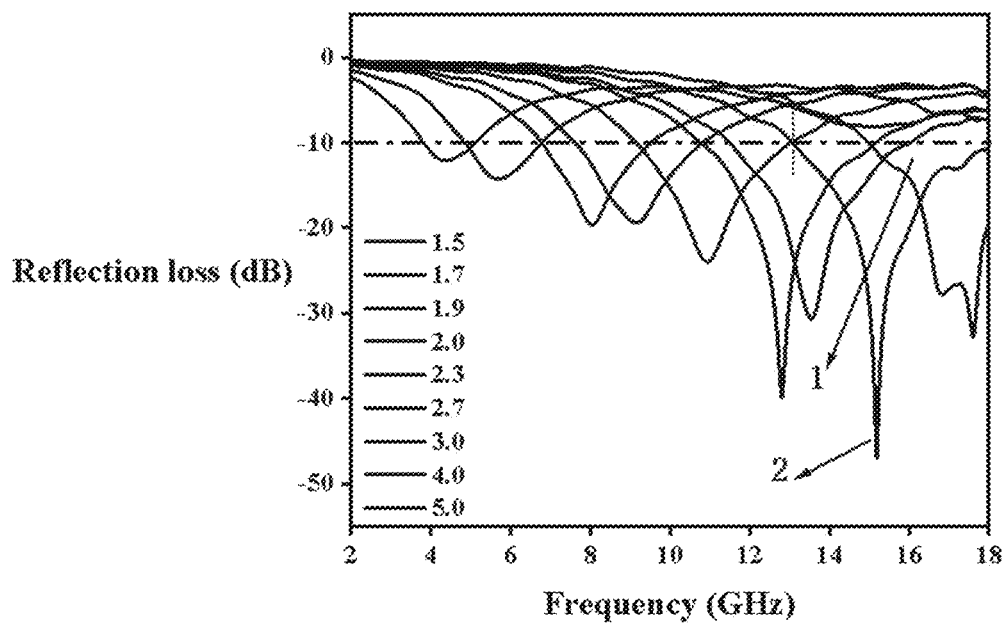
FIG. 9 is the RL of CNHs composite material in Example 2.

In Example 2, the TEM image of the CNHs composite material shows that the shell thickness of CNHs composite material is about 10 nm (FIG. 8). In FIG. 9, the MA capability of CNHs composite material in this example is extremely strong with the minimum RL value 2 of −46.98 dB at 15.2 GHz with the thickness of 1.7 mm, exhibiting absorption capacity in Ku band and the maximum $EAB_{max}$1 is 5 GHz.

Example 3

The Si/C precursor was obtained by mixing silicon particles and graphite powder by using the planetary ball mill device at a speed of 180 r/min for 13 min, and a weight ratio of silicon element to carbon element is 30%.

Put the precursor into a mold, and performed cold isostatic pressing at a pressure of 12 MPa and holding the pressure for 15 min to obtain precursor block;

Put the graphite block as an anode into a carbon crucible, a graphite rod sharpened at one end as a cathode, and perform plasma treatment in an 80 kPa $CO_2$ atmosphere. The working current is 220 A. Finally, the CNHs composite material were obtained, and which was put in a dry environment for storage.

Figure 10:
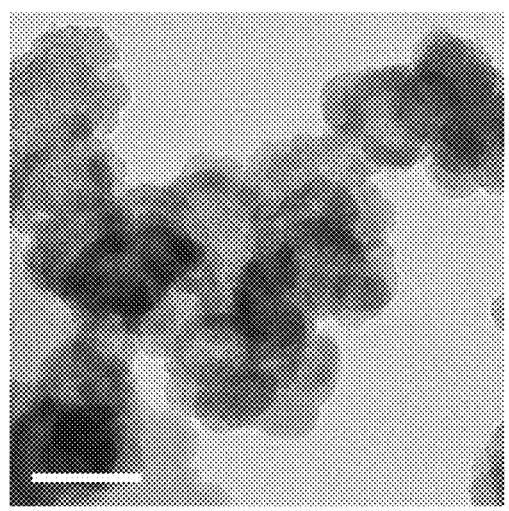
FIG. 10 is a TEM image of CNHs composite material prepared in Example 3 (Scale bar is 100 nm).
Figure 11:
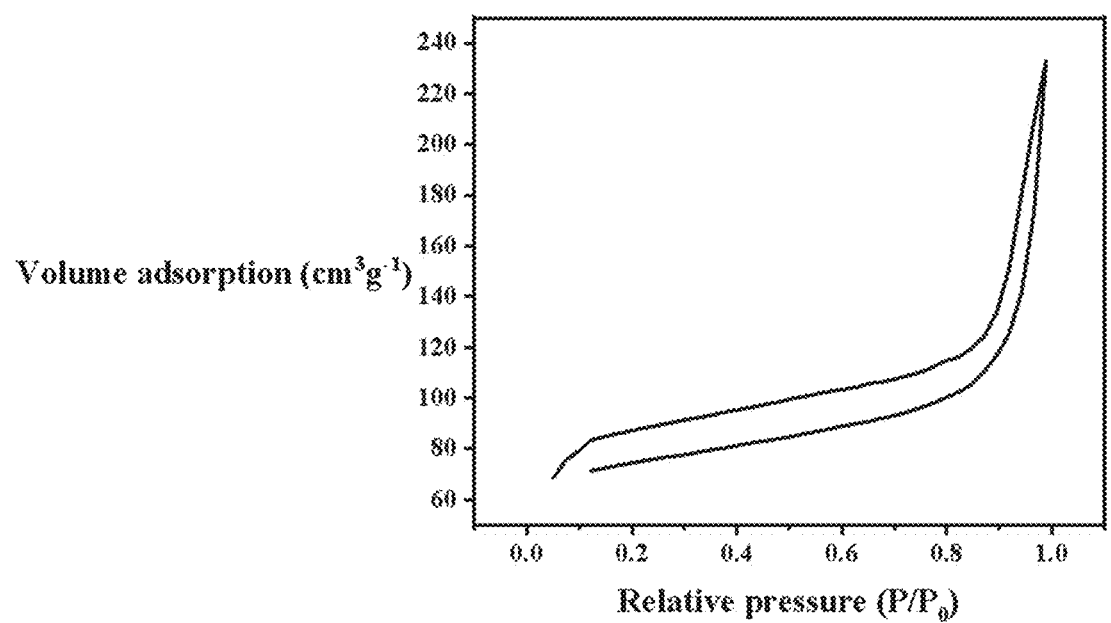
FIG. 11 Brunner-Emmet-Teller (BET) measurements of CNHs composite material in Example 3.
Figure 12:
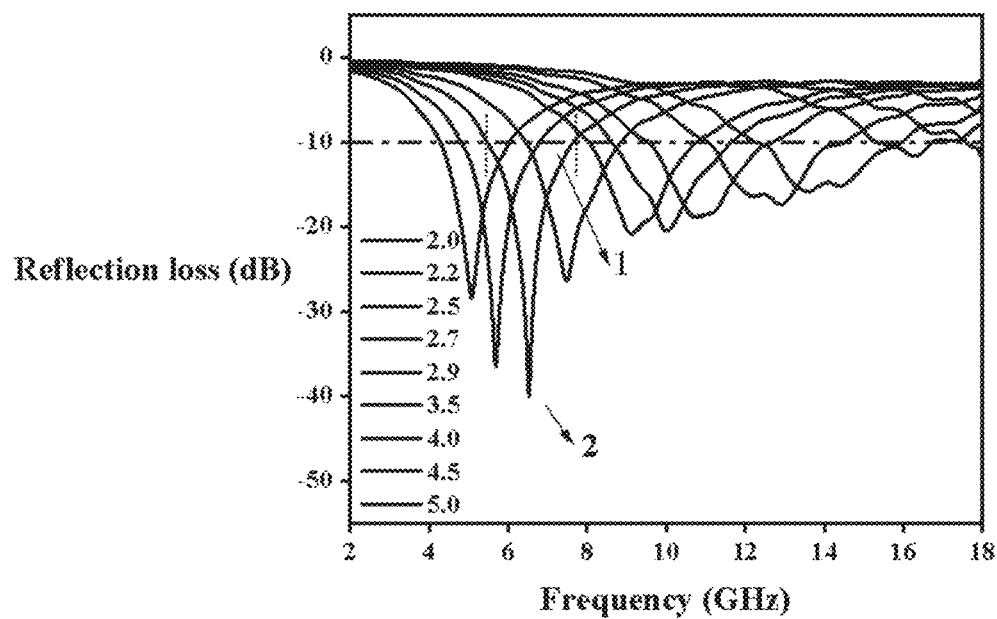
FIG. 12 is the RL of CNHs composite material in Example 3.

In Example 3, the TEM image of the CNHs composite material shows that the shell thickness of CNHs composite material is about 26 nm (FIG. 10), and the spherical diameter of CNHs composite material with spherical core-shell structure is 100 nm. As shown in FIG. 11, the specific surface area of CNHs composite material in this sample is 278.65 $m^2$/g, the high specific surface area is benefit for the MA capability. In FIG. 12, the MA capability of CNHs composite material in this example is extremely strong with the minimum RL value 2 of −40.03 dB at 6.3 GHz with the thickness of 4.0 mm, exhibiting absorption capacity in C band and the $EAB_{max}$ 1 is 2.3 GHz.

Example 4

The Si/C precursor was obtained by mixing silicon particles with graphite powder by using the planetary ball mill device at a speed of 200 r/min for 15 min, and a weight ratio of silicon element to carbon element is 35%.

Put the precursor into a mold, and performed cold isostatic pressing at a pressure of 11 MPa and holding the pressure for 20 min to obtain precursor block;

Put the graphite block as an anode into a carbon crucible, a graphite rod sharpened at one end as a cathode, and perform plasma treatment in a 70 kPa $CO_2$ atmosphere. The working current is 220 A. Finally, the CNHs composite material were obtained, and which was put in a dry environment for storage.

Figure 13:
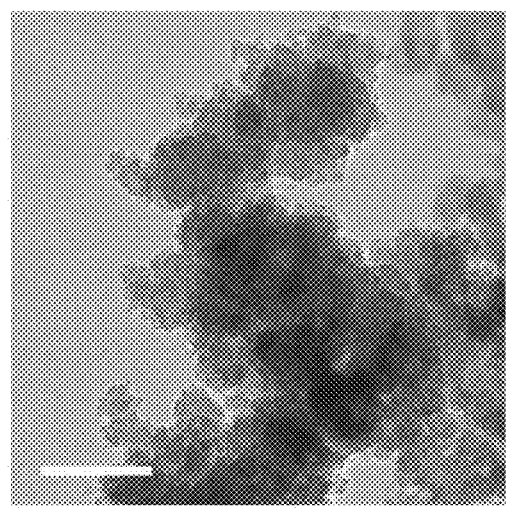
FIG. 13 is a TEM image of CNHs composite material prepared in Example 4 (Scale bar is 100 nm).
Figure 14:
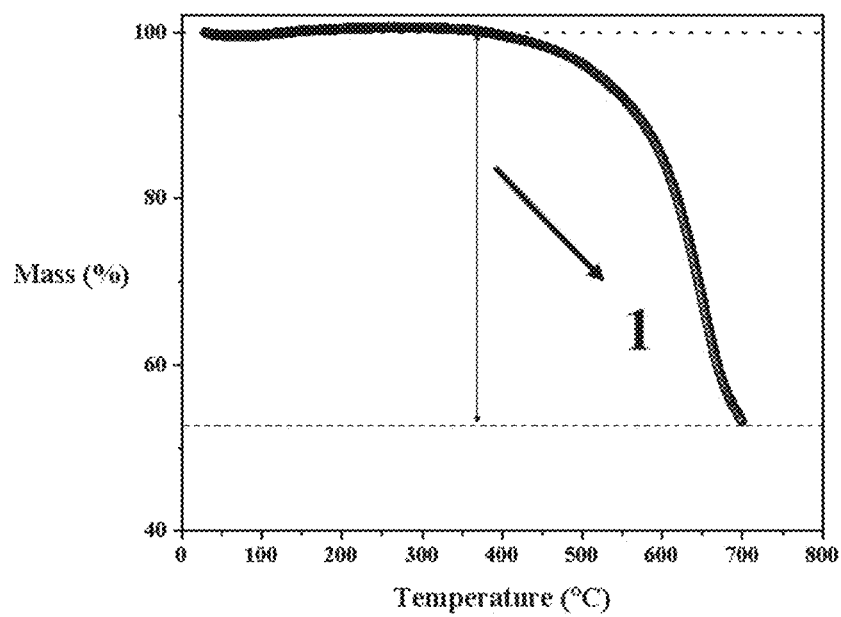
FIG. 14 is the thermogravimetry (TG) of CNHs composite material prepared in Example 4.

In Example 4, The FIG. 13 shows that the TEM image of the CNHs composite material shows that the shell thickness of CNHs composite material is too thick to distinguish the CNHs (core) and $SiO_2$ (shell). As shown in FIG. 14, the TG data shows that the mass of $SiO_2$ 1 accounted for 46.75% of the total mass of the composite.

What is claimed is:

1. A method for preparation of carbon nanohorns composite material, the method comprising:
    a. mixing material containing silicon particles and graphite powder with a weight ratio of silicon element to carbon element 10% to 40% by using a planetary ball mill device at a predetermined speed and a first predetermined time to obtain a Si/C precursor;
    b. compressing the Si/C precursor into a first graphite block by a cold isostatic pressing device for a predetermined pressure and a second predetermined time to obtain a precursor block;
    c. putting the precursor block as an anode into a DC arc plasma device, arranging a second graphite rod sharpened at one end as a cathode opposite to the anode, filling the plasma device with preset gas, and then starting the plasma device to synthesis carbon nanohorns composite material.

2. The method of claim 1, wherein the predetermined speed is 100-200 r/min and the first predetermined time is 10-30 min.

3. The method of claim 1, wherein a diameter of the precursor block is 20 mm.

4. The method of claim 1, wherein the predetermined pressure is 8-12 MPa and the second predetermined time is 5-20 min.

5. The method of claim 1, wherein a diameter of the second graphite rod is 10-15 mm, and a distance between cathode and anode is 2-5 mm.

6. The method of claim 1, wherein a pressure of the preset gas is 40-100 kPa, a working current of the DC arc plasma device is 120-300 A.

7. The method of claim 1, wherein the preset gas is pure carbon dioxide, pure carbon monoxide, oxygen, air, or a mixture of two or more of these gases.

8. The method of claim 7, wherein the preset gas is pure $CO_2$ or air.

9. Carbon nanohorns composite material, wherein the carbon nanohorns composite material is in a core-shell structure with carbon nanohorns as a core and amorphous $SiO_2$ as a shell surrounding the core, a thickness of the shell is 5-30 nm, and a mass ratio of the shell is 6-62%.

10. The carbon nanohorns composite material of claim 9, wherein the carbon nanohorns composite material is in a spherical shape with a spherical diameter of 60-180 nm.

11. The carbon nanohorns composite material of claim 9, wherein the carbon nanohorns composite material has an $I_D/I_G$ vale of 1.1-1.5.

* * * * *